United States Patent
Debellis et al.

(10) Patent No.: US 11,829,993 B2
(45) Date of Patent: Nov. 28, 2023

(54) ACCELERATED VIRTUAL CARD PAYMENTS IN B2B TRANSACTIONS

(71) Applicant: MASTERCARD INTERNATIONAL INCORPORATED, Purchase, NY (US)

(72) Inventors: Anthony Debellis, Stamford, CT (US); Shlomo Akiva Mayer, Clifton, NJ (US); Aazum Shaikh, New York, NY (US); Travis Brown, Bethel, CT (US); Kelvin Leung, Penham, NY (US); Robert Pacifico, Ridgefield, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 34 days.

(21) Appl. No.: 17/525,583

(22) Filed: Nov. 12, 2021

(65) Prior Publication Data

US 2022/0188805 A1 Jun. 16, 2022

Related U.S. Application Data

(60) Provisional application No. 63/125,755, filed on Dec. 15, 2020.

(51) Int. Cl.
*G06Q 20/10* (2012.01)
*G06Q 20/34* (2012.01)
(Continued)

(52) U.S. Cl.
CPC ......... *G06Q 20/351* (2013.01); *G06Q 20/065* (2013.01); *G06Q 20/102* (2013.01); *G06Q 20/407* (2013.01); *G06Q 30/016* (2013.01)

(58) Field of Classification Search
None
See application file for complete search history.

(56) References Cited

U.S. PATENT DOCUMENTS

| 9,760,871 | B1 | 9/2017 | Pourfallah et al. |
| 2015/0026036 | A1 | 1/2015 | Bloomston |

(Continued)

FOREIGN PATENT DOCUMENTS

| KR | 102112063 | | 5/2020 | |
| KR | 102398155 | B1 * | 5/2022 | ............. G06Q 20/42 |

OTHER PUBLICATIONS

International Search Report and Written Opinion issued in corresponding International Application No. PCT/US2021/059306, dated Mar. 7, 2022.

(Continued)

*Primary Examiner* — Joseph W. King
(74) *Attorney, Agent, or Firm* — Pillsbury Winthrop Shaw Pittman LLP

(57) ABSTRACT

The disclosure herein relates to methods and systems of that facilitate instant payment of invoices based on automatic, intelligent, predictions that a buyer will approve an invoice without express input by the buyer. For example, a system may determine a probability that an invoice will be approved for payment by a buyer with express approval from the buyer. Once an invoice is automatically approved for payment, the system may employ various automated systems to facilitate payment to suppliers without the need for suppliers to extract virtual card data or other payment information from email payment requests or other invoice payment requirements to receive payment. For example, the system may generate calls to automatically generate virtual card numbers on behalf of buyers and submit payment messages for payments to suppliers using the virtual card numbers.

18 Claims, 10 Drawing Sheets

(51) Int. Cl.
     *G06Q 30/016*     (2023.01)
     *G06Q 20/40*      (2012.01)
     *G06Q 20/06*      (2012.01)

(56) References Cited

U.S. PATENT DOCUMENTS

| | | | |
|---|---|---|---|
| 2016/0140557 A1* | 5/2016 | Hansel | G06Q 20/12 |
| | | | 705/26.82 |
| 2018/0047073 A1 | 2/2018 | Neumark | |
| 2019/0087913 A1* | 3/2019 | Brown | G06F 16/93 |
| 2020/0364760 A1* | 11/2020 | Sabat | G06Q 10/0838 |

OTHER PUBLICATIONS

Bahrami, B et al., Using Behavioral Analytics to Predict Customer Invoice Payment, Big Data, Feb. 2020.

* cited by examiner

ACCELERATED VIRTUAL CARD PAYMENTS IN B2B TRANSACTIONS

PRIORITY

This application claims the benefit of priority to U.S. Provisional Patent Application No. 63/125,755, filed Dec. 15, 2020, entitled "ACCELERATED VIRTUAL CARD PAYMENTS IN B2B TRANSACTIONS", the disclosure of which is hereby incorporated by reference in its entirety.

BACKGROUND

Extended payment terms and late payments are a leading point of friction in business-to-business (B2B) payments from buyers to suppliers. In some instances, suppliers may be offered payments 10-15 days sooner in exchange for accepting virtual card payments. However, invoice approval by the buyers can be a laborious and time-consuming bottleneck, limiting the speed and efficiency with which payment systems may provide payment to suppliers. Furthermore, the use of electronic systems that leverage virtual card payments is inefficient because suppliers may be required to manually enter virtual card transactions received by email in order to access their funds. These and other issues may exist for electronic systems for processing invoice payments.

BRIEF DESCRIPTION OF THE DRAWINGS

Features of the present disclosure may be illustrated by way of example and not limited in the following figure(s), in which like numerals indicate like elements, in which.

DETAILED DESCRIPTION

The disclosure herein relates to systems and methods that facilitate instant payment of invoices based on automatic and intelligent determinations, e.g., predictions, that a buyer will approve an invoice without express approval by the buyer. For example, a computer system may be improved to leverage machine learning to analyze and train an invoice classifier using data from invoices that suppliers send to their customers. The invoice classifier may identify problematic invoices that are likely to be denied payment and/or approved invoices that are likely to be approved for payment. Once an invoice is automatically approved for payment, the system may employ various automated systems to facilitate payment to suppliers. Such automated payment may be made without requiring suppliers to extract virtual card data or other payment information from email payment requests or other invoice payment requirements to receive payment. For example, the system may generate calls to automatically generate virtual card numbers on behalf of buyers. The system may initiate payment processing operations to automatically facilitate payment using the generated virtual card numbers seamlessly without intervention by the buyer or the supplier. In some examples in which the invoice classifier has approved an invoice for payment, the system may initiate the payment processing operations early such that, for instance, the virtual card numbers may be generated prior to a timing at which virtual card numbers are normally generated. In some examples, the payment processing operations may include electronic mail (email) interception, which may be used for automated compatibility with some invoice payment systems. In other examples, payment processing operations may include Straight Through Processing (STP) operations.

Figure 1:
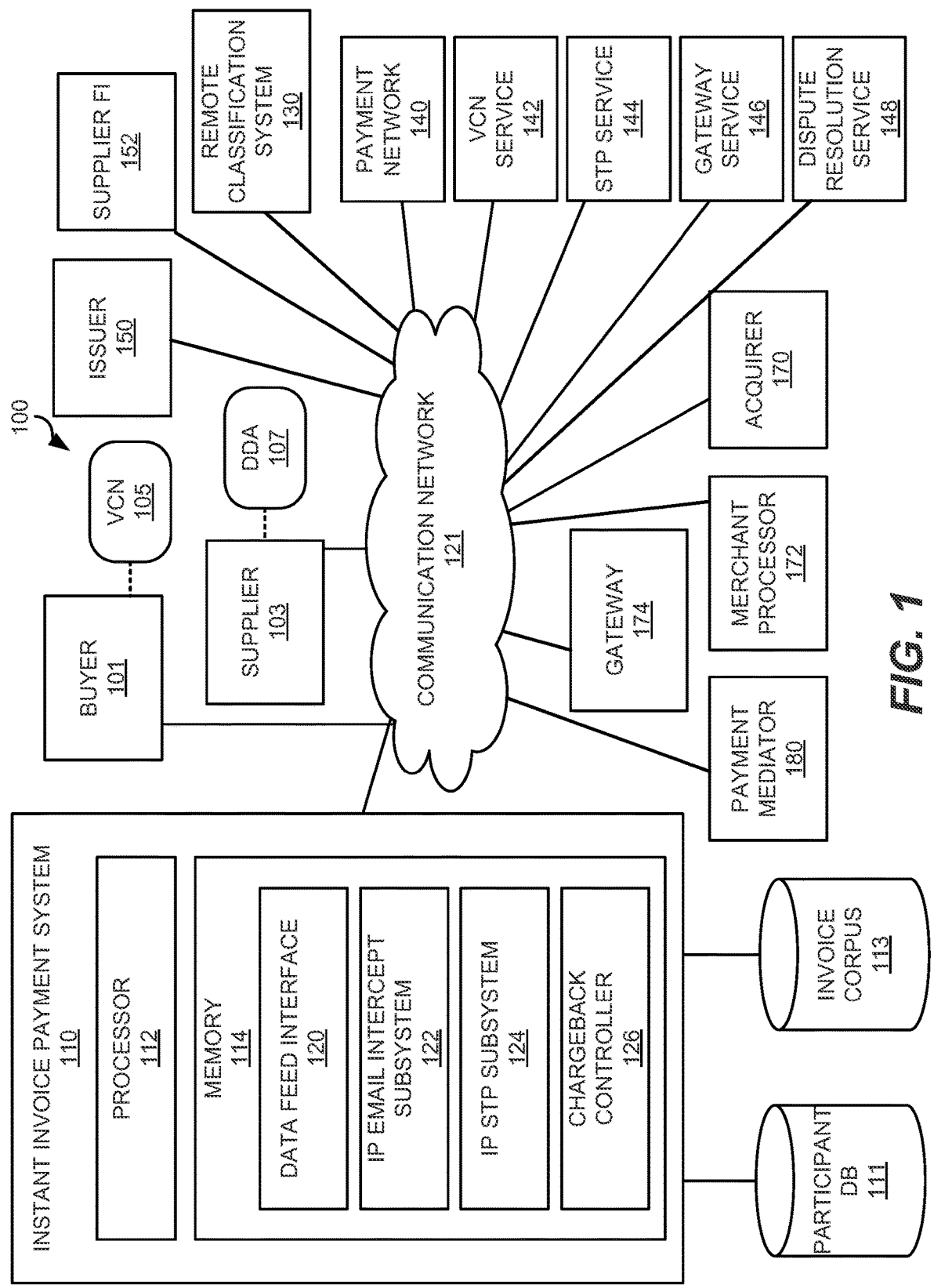
FIG. 1 illustrates an example of a system of instant payment of invoices.

Having described an overview of various system operations, attention will now turn to a description of a system to provide instant payment of invoices. For example, FIG. 1 illustrates an example of a system environment 100 of instant payment of invoices. The system environment 100 may include, among other things, a buyer 101, a supplier 103, a participant database (DB) 111, an invoice corpus 113, an instant invoice payment system (hereinafter, "IP system") 110, a remote classification system 130, a payment network 140, a Virtual Card Number (VCN) service 142, an STP service 144, a gateway service 146, a dispute resolution service 148, an issuer 150, a supplier financial institution (FI) 152, an acquirer 170, a merchant processor 172, a gateway 174, a payment mediator 180, and/or other components. In general, the components included in system environment 100 can communicate with one another via communication network 121.

As used herein, the term "instant payment" may refer to processing a given invoice payment automatically without intervention by a buyer or a seller other than sharing the invoice with the system. Because the system may leverage a payment network for the instant payment, the time to transfer funds can approximate an amount of time associated with processing a payment card (such as a credit card) payment through a payment network. Such time for handling an instant payment is contrasted with the greater amount of time that an invoice decision and payment would otherwise take without the systems and methods disclosed herein.

The buyer 101 may refer to an entity that receives goods or services from a supplier 103 in exchange for payment. The supplier 103 may refer to an entity that provides the goods or services to the buyer 101 in exchange for the payment. The supplier 103 may generate an invoice for payment by the buyer 101. The buyer 101 and/or the supplier 103 may share the invoice with the IP system 110 for instant payment by the IP system 110. In some examples, the buyer 101 and the supplier 103 are each business entities, in which case the provision of goods or service may relate to a business-to-business ("B2B") transaction. It should be noted that the buyer 101 and the supplier 103 may each interact with the system environment 100 through respective devices (not illustrated). As such, providing data to and/or from the buyer 101 and the supplier 103 can include transmission of the data to these respective devices (e.g., via communication network 121).

The participant database 111 may be a database that includes information for participants such as buyers 101 and suppliers 103. In some examples, the participants may be identified by a participant identifier that identifies either a buyer 101, a supplier 103, and/or other system user. The invoice corpus 113 may be a database that includes a corpus of invoice data from invoices of suppliers 103 for payment by buyers 101. The invoice data may include information such as a supplier identifier, a buyer identifier, an invoice identifier, a description of the goods or services provided, an invoice amount (an amount due for the goods or services and/or any other fees to be paid), and/or other information relating to an invoice. In some examples, the invoice corpus may store an invoice identifier that identifies a given invoice with a transaction identifier that identifies a payment transaction made over a payment network 140.

In some examples, the invoiced data may include an indication of whether the invoice was approved, declined, and/or adjusted by the corresponding buyer 101 for payment to the corresponding supplier 103. In these examples, the invoice corpus 113 may be used to train invoice classifiers that generate a probability of invoice approval by the buyer 101. For example, the remote classification system 130 may be provided with access to the invoice data stored in the invoice corpus 113. The remote classification system 130 may train an invoice classifier through machine-learning techniques in which labeled invoice data is correlated with invoice features. In some examples, the labels may correspond to an invoice outcome such as an approval, rejection, adjustment, a history of disputed invoices between the buyer 101 and the supplier 103, a historical frequency at which the supplier 103 submitted invoices to the buyer 101, and/or other dispositions of invoices. The features may include the identity of the buyer 101, the identity of the supplier 103, the invoice amount, the type of goods or services provided, a date or time of invoice submission, and/or other invoice data that may be correlated to an invoice outcome. As such, the invoice classifier may be trained to generate a prediction of an invoice outcome as an output given invoice data as an input. For instance, the remote classification system 130 may train the invoice classifier to determine whether or not to, following receipt of an invoice shared by a buyer 101 for goods or services received by the buyer 101 from a supplier 103, execute a virtual card transaction early. The virtual card transaction may be deemed to be executed early when the virtual card transaction is executed within the day on which the invoice is received, when the virtual card transaction is executed ahead of the buyer's acceptance of the invoice, and/or other times prior to a normal timing at which the virtual card transaction is executed4.

As will be described below, for a given invoice, the IP system 110 may provide invoice data to the remote classification system 130 and receive an output of the invoice classifier based on the invoice data provided as an input to the remote classification system 130. During operation, the IP system 110 may update the invoice corpus 113 with invoice submissions and invoice outcomes. In this way, the invoice classifier may be refined with new invoice data and outcomes. Alternatively, the invoice classifier may be executed by the IP system 110 instead of, or in addition to, execution at the remote classification system 130. The invoice classifier may be referred to as a "remote invoice classifier" when executing at the remote classification system 130.

The payment network 140 may include one or more networked devices that implement a set of communication standards for exchanging financial data and settling funds between financial institutions. An example of a communication standard is the International Organization for Standardization ISO 8583 standard for the exchange of electronic transactions. An example of a payment network 140 is the Mastercard® payment network. In some examples, the payment network 140 may implement various services for payments. For example, the payment network 140 may implement the VCN service 142, the STP service 144, the gateway service 146, the dispute resolution service 148, and/or other services. Alternatively, one or more of the VCN service 142, the STP service 144, and the gateway service 146 may each be standalone services (e.g., services not provided by the payment network 140).

The VCN service 142 may generate and maintain VCNs to facilitate payments. An example of a VCN service 142 is the Mastercard® InControl™ for Commercial Payments (ICCP) system. A VCN 105 may refer to an account identifier recognized by the payment network 140 for payments through the payment network 140. The VCN 105 may be dynamically generated by the VCN service 142 to pay for a particular invoice. The VCN 105 may include a series of digits having a minimum length of 11 and a maximum length of 19. The VCN 105 may be dynamically generated and then mapped to a primary account number (PAN) (not illustrated) that is associated with an account of the buyer 101. The account may be held at the issuer 150. Doing so permits the VCN 105 tied to the PAN without exposing the PAN. Thus, while the VCN 105 may be used to make authorization requests to the payment network 140, the actual PAN may not be exposed. In these examples, the VCN 105 may be used to transact payments on the payment network 140 through a mapping of the VCN 105 with the PAN. In these examples, the VCN 105 may include a Bank Identification Number (BIN) that identifies the VCN service 142 that generated the VCN 105 and that stores a mapping between the VCN 105 and the PAN.

The STP service 144 may provide direct payments to a demand deposit account (DDA), such as the DDA 107 of a supplier 103. The STP service 144 may submit authorization requests to the payment network 140 on behalf of the supplier 103 using a VCN 105 of the buyer 101.

The gateway service 146 may emulate a point of sale (POS) terminal that transmits payment requests to an acquirer 170. Thus, the gateway service 146 may facilitate transactions between the buyer 101 and the supplier 103 without the supplier 103 having to, for example, swipe a credit card for payment.

The dispute resolution service 148 may provide chargeback services for resolving payment transaction disputes. An example of a dispute resolution service 148 may include the Mastercom® service from Mastercard®.

The one or more issuers 150 may each be an FI that issues payment cards and is responsible for making payments for transactions using the payment cards. In this case, the issuer 150 may be responsible for payments made via the VCN 105.

The acquirer 170 may be an FI that a merchant may use to process and receive payments on behalf of the merchant. Alternatively, the merchant may use a merchant processor 172. In this case, the acquirer 170 or the merchant processor 172 may act on behalf of the supplier 103 to process payments through the VCN 105.

The gateway 174 may pass credit card transaction information from the merchant to FIs, such as the issuer 150 of the credit card, via the payment network 140. In this case, the gateway 174 may be used to pass the VCN 105 for invoice payment from the buyer 101 to the supplier 103.

The payment mediator 180 may include a third-party payment processor that mediates payments between the buyer 101 and the supplier 103.

The IP system 110 may be programmed to facilitate instant payment of invoices from a supplier 103 to be paid by a buyer 101. For example, the IP system 110 may automatically predict that the invoice will be approved by the buyer 101 without an input from the buyer 101. The IP system 110 may then initiate payment processing that automatically (e.g., without intervention by the buyer 101 and supplier 103 other than sharing of the invoice to the IP system 110) transfers funds from the buyer 101 to the supplier 103.

The IP system 110 may include a processor 112, a memory 114, a data feed interface 120, an instant pay (IP) email intercept subsystem 122, an IP STP subsystem 124, a chargeback controller 126, and/or other components. The processor 112 may be a semiconductor-based microprocessor, a central processing unit (CPU), an application specific integrated circuit (ASIC), a field-programmable gate array (FPGA), and/or other suitable hardware device. Although the AI-based system 110 has been depicted as including a single processor 112, it should be understood that the IP system 110 may include multiple processors, multiple cores, or the like. The memory 114 may be an electronic, magnetic, optical, or other physical storage device that includes or stores executable instructions. The memory 114 may be, for example, Random Access memory (RAM), an Electrically Erasable Programmable Read-Only Memory (EEPROM), a storage device, an optical disc, and the like. The memory 114 may be a non-transitory machine-readable storage medium, where the term "non-transitory" does not encompass transitory propagating signals.

The data feed interface 120, the IP email intercept subsystem 122, the IP STP subsystem 124, and/or the chargeback controller 126 may each be implemented as instructions that program the processor 112. Alternatively, or additionally, the data feed interface 120, the IP email intercept subsystem 122, the IP STP subsystem 124, and/or the chargeback controller 126 may each be implemented in hardware. FIGS. 2-6 may refer back to features of FIG. 1 to describe system components.

The data feed interface 120 may include an electronic file transfer interface, an Application Programming Interface (API), and/or other data transfer through which invoices may be shared with the IP system 110 from the buyer 101 and/or the supplier 103. For example, the data feed interface 120 may implement an electronic data transfer protocol such as a file transfer protocol (FTP), hypertext transfer protocol (HTTP), and/or other type of data transfer protocol. In some examples, the data feed interface 120 may expose an API through which data may be transferred from the buyer 101 and/or the supplier 103. In these examples, the buyer 101 and/or the supplier 103 may execute API calls to upload the data.

The IP email intercept subsystem 122 and the IP STP subsystem 124 may each use the remote classification system 130 to automatically predict buyer 101 approval for a given invoice. The IP email intercept subsystem 122 may facilitate automatic payment of the invoice through email or other electronic communication transmission. The IP STP subsystem 124 may facilitate automatic payment of the invoice through STP. In some examples, either the IP email intercept subsystem 122 or the IP STP subsystem 124, depending on an instant payment configuration of the buyer 101 or the supplier 103, can facilitate automatic payments. For example, a first buyer 101 may prefer or otherwise set the instant payment configuration to indicate that invoice payments are to be processed through the IP email intercept subsystem 122 while a second buyer 101 may prefer or otherwise configure the instant payment configuration to indicate that invoice payments are to be processed through the IP STP subsystem 124. Such instant payment configuration may be stored in the participant database 111. An example operation of the IP email intercept subsystem 122 is described with reference to FIGS. 2 and 3. An example operation of the IP STP subsystem 124 is described with reference to FIGS. 4 and 5.

Regardless of how instant invoice payment is made, the IP email intercept subsystem 122 and the IP STP subsystem 124 may each cause invoice payment to be made to the DDA 107 of the supplier 103 using the VCN 105 assigned to the buyer 101. In some instances, predicting buyer 101's approval of a given invoice from a supplier 103 may be incorrect. In these instances, the buyer 101 may provide an indication that the invoice was errantly paid. The chargeback controller 126 may receive such indication and initiate a chargeback that debits the payment from the DDA 107 of the supplier 103. An example of such chargeback operation is described with reference to FIG. 7.

Figure 2:
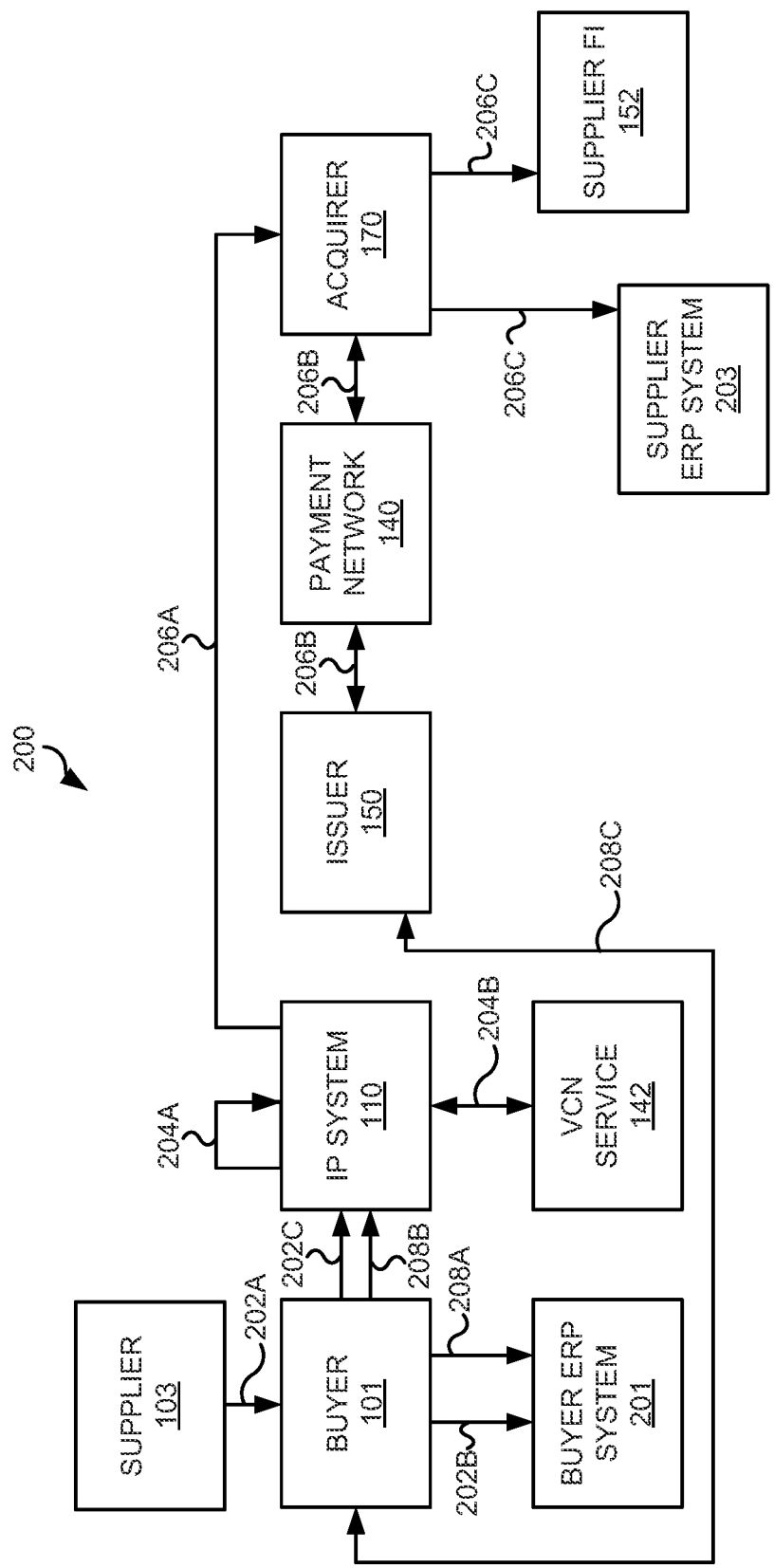
FIG. 2 illustrates a flow diagram of example operations of an email intercept model for instant payment of invoices.

FIG. 2 illustrates a flow diagram 200 of example operations of an email intercept model for instant payment of invoices. In the example operations that follow, operations 202A-C represent invoice routing, operations 204A-B represent VCN authorization, operations 206A-C represent VCN payment operations, and operations 208A-C represent buyer settlement.

Invoice Routing

At 202A, the supplier 103 may transmit an invoice to the buyer 101. At 202B, the buyer 101 may record the invoice into a buyer Enterprise Resource Planning (ERP) system 201. At 202C, the buyer 101 may transmit the invoice to the IP system 110. In some examples, the buyer 101 may transmit the invoice in batches with other invoices from the supplier 103 and/or other suppliers 103. Such batches may be hourly, daily, and/or other periodic basis. In other examples, the buyer 101 may transmit the invoice in real-time. "Real-time" may refer to non-batched transmission to the IP system 110 when the buyer 101 receives the invoice from the supplier 103.

VCN Authorization

At 204A, the IP system 110 may score a likelihood of the buyer 101 approving an invoice. Such scoring may be made without an express decision from the buyer 101 regarding invoice approval. Put another way, the buyer 101 may transmit the invoice without approving, rejecting, or modifying the invoice (which may be along with other invoices) to the IP system 110. The IP system 110 in turn may predict a likelihood of the buyer 101 approving the invoice. The foregoing may automate invoice payment and facilitate instant payment of such invoice. "Instant payment" may refer to a comparable amount of time that a payment card (such as a credit card) payment is made through the payment network 140. Such instant payment is contrasted with the greater amount of time that an invoice decision and payment would otherwise take without the IP system 110. It should be noted that actual settlement of funds may take the customary time for payment card transactions executed over the payment network 140.

The score may indicate a probability of invoice approval by the buyer 101. The probability may be generated by an invoice classifier. In some examples, the invoice classifier may execute at the remote classification system 130 illustrated in FIG. 1. If the score exceeds a minimum threshold value such as 98%, or 0.98 probability, then the IP system 110 may predict invoice approval by the buyer 101. Other threshold values may be used. In some examples, the threshold value may be modified or updated based on observations of invoice results. For example, if the buyer 101 indicates that an invoice predicted to be approved by the buyer 101 should have been denied, then the IP system 110 may increase and/or use a higher threshold value.

At 204B, the IP system 110 may request a VCN 105 from the VCN service 142. For example, the IP system 110 may make a call to an API linked to an ICCP instance of the issuer 150. The IP system 110 may transmit a payment request to an acquirer 170 that acts on behalf of the supplier 103.

VCN Payment

At 206A, the acquirer 170 may receive the payment request from the IP system 110 and transmit the payment request to the payment network 140 on behalf of the supplier 103. At 206B, the payment network 140 may transmit the payment request to the issuer 150. Subject to approval by the issuer 150, the payment network 140 may transmit the approval to the acquirer 170. At 206C, the acquirer 170 may fund an account, such as the DDA 107, of the supplier 103 held at the supplier FI 152. The acquirer 170 may transmit a consolidated remittance file to a supplier ERP 203 of the supplier 103.

Buyer Settlement

At 208A, the buyer 101 may record an invoice approval status in the buyer ERP system 201. At 208B, the buyer 101 may transmit newly approved invoice data, such as via a data feed, to the IP system 110. At 208C, the buyer 101 may settle an outstanding credit line with the issuer 150 according to their internal processing and may receive a rebate for using the platform provided by the IP system 110.

Figure 3:
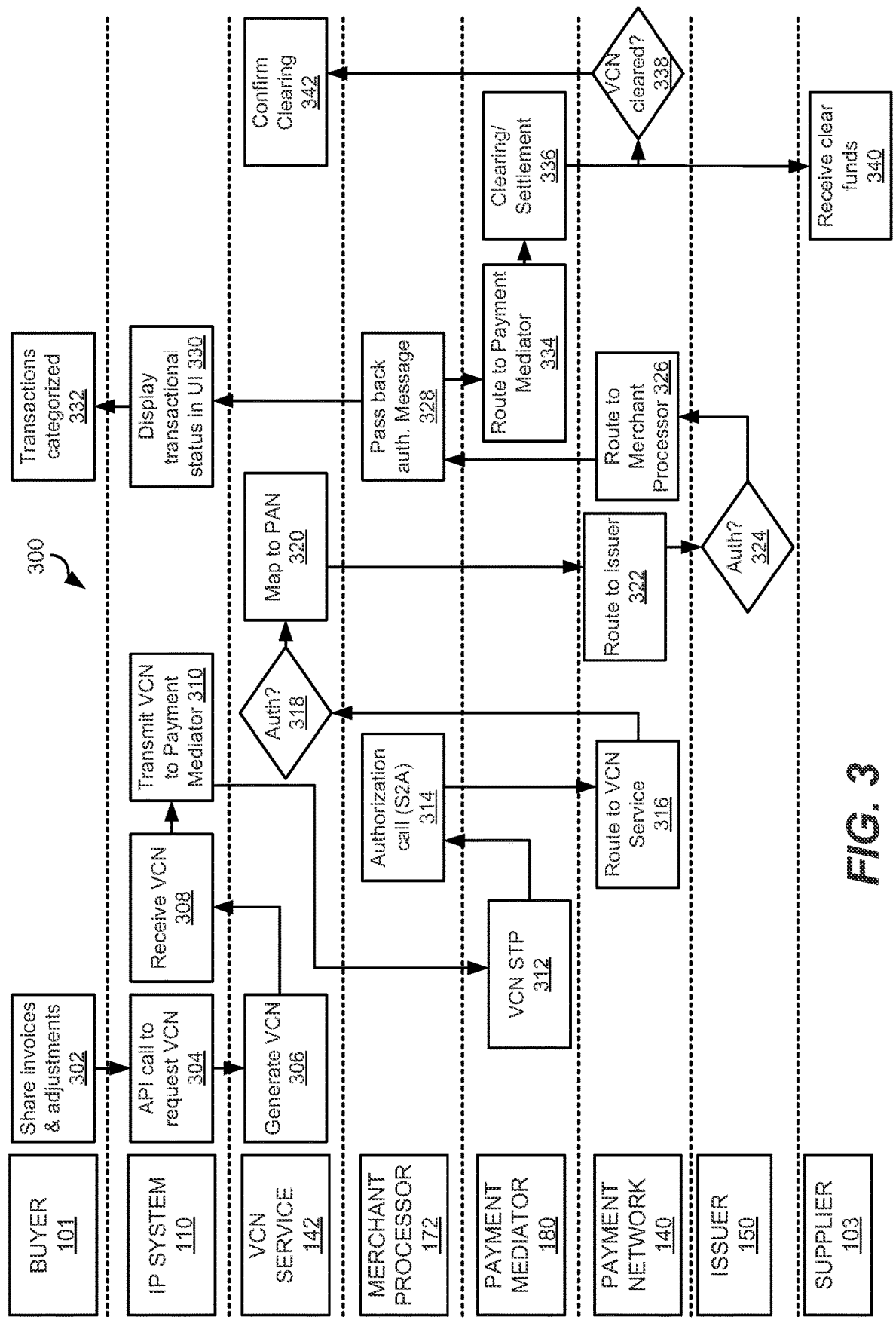
FIG. 3 illustrates a flow diagram of example instant payment transactions in the email intercept model of FIG. 2.

FIG. 3 illustrates a flow diagram 300 of example instant payment transactions in the email intercept model of FIG. 2. At 302, the buyer 101 may share new invoices and adjustments to invoices with the IP system 110, such as through the data feed interface 120. Such sharing may occur on a periodic basis such as a daily, weekly, or other periodic basis. At 304, the IP system 110 may access the shared invoices from the buyer 101. The IP system 110 may identify the buyer 101, such as through the participant identifier, which may be included in the data accessed via the data feed interface 120. The IP system 110 may request a VCN 105 for the buyer 101, such as through an API call to the VCN service 142.

At 306, the VCN service 142 may generate a VCN 105 for the buyer 101 responsive to the request from the IP system 110. The VCN 105 may encode an identification number that indicates an account of the buyer 101 from which a payment is to be made. The identification number (such as the first four to six digits) may include a BIN that identifies the VCN service 142 so that the VCN 105 may identify not only the account of the buyer 101, but also the VCN service 142 to which to route payments.

At 308, the IP system 110 may receive the VCN 105 from the VCN service 142. At 310, the IP system 110 may transmit the VCN 105 to the payment mediator 180. Such transmission may be via an email to an email address of the payment mediator 180 that accepts requests for payments. For example, the IP system 110 may transform the invoice data into an email format that includes the VCN 105, the invoice amount, identification of the supplier 103, and/or other information for electronic payment submission to the payment network 140. Through this transformation, the IP system 110 may be improved to leverage the payment network 140, which may ordinarily process payment transactions between a merchant and a customer, to facilitate an instant payment from the buyer 101 to the supplier 103 to pay an invoice from the supplier 103.

At 312, the payment mediator 180 may identify a merchant processor 172 used by the supplier 103 and transmit a request to process the invoice amount using the VCN 105. At 314, the merchant processor 172 may generate and transmit an authorization call to the payment network 140. The authorization call may be formatted as an ISO 8583 message and configured as a switch-to-acquirer (S2A) transaction.

At 316, the payment network 140 may recognize the VCN service 142 from the VCN 105. For example, the payment network 140 may recognize the VCN service 142 via the BIN corresponding to the VCN service 142 encoded in the VCN 105. The payment network 140 may then route the VCN 105 back to the VCN service 142 for authentication. At 318, the VCN service 142 may determine whether the VCN 105 is authentic by consulting its previously created VCNs. It should be noted that if the authentication at 318 (or other operations illustrated in FIG. 3 or FIG. 5 in which an authentication operation is performed) fails or is otherwise denied, then a message may be reported back to the IP system 110 with reasons for such authentication failure. For example, if the VCN 105 is not authentic, an indication of such non-authentication may be provided to the IP system 110.

At 320, responsive to a determination that the VCN 105 is authentic, the VCN service 142 may map the VCN 105 to the corresponding PAN of the buyer 101. The VCN service 142 may then provide the PAN back to the payment network 140. At 322, the payment network 140 may identify an issuer 150 based on the PAN and route the PAN to the identified issuer 150 for authorization of the invoice amount. At 324, the issuer 150 may determine whether the invoice amount from the PAN is authorized. The issuer 150 may apply various rules such as credit limit rules to determine whether the transaction should be authorized. The issuer 150 may transmit an authentication message back to the payment network 140.

At 326, the payment network 140 may route the authentication message to the merchant processor 172. At 328, the merchant processor 172 may provide the authentication message to the IP system 110 and the payment mediator 180. At 330, the IP system 110 may provide a transactional status based on the authentication message to indicate whether or not the invoice payment was approved. At 332, the buyer 101 (or the ERP or AP system of the buyer) may store an indication of the transactional status and categorize the invoice. At 334, the payment mediator 180 may receive the authentication message routed from the merchant processor 172. At 336, the payment mediator 180 may add the transaction to a clarifying file and apply an assigned identifier for the supplier 103, for example, in the Mastercard® network, the assigned identifier may include the Mastercard® Assigned Identifier (MAID). Other identifiers that may be required by other payment networks 140 may be used as well or instead, depending on the particular payment network 140 being used. The payment mediator 180 may generate a clearing/settlement instruction for clearing funds on behalf of the supplier 103, such as to credit the DDA 107 of the supplier 103. At 338, the payment network 140 may provide indications of whether or not the transaction has cleared. It should be noted that if the VCN 105 is not cleared at 338 (or other operations illustrated in FIG. 3 or FIG. 5 in which a VCN 105 clearance operation is performed), then a message may be reported back to the IP system 110 with reasons for such VCN 105 clearance failure. For example, if the VCN 105 is not cleared, an indication of such non-clearance may be provided to the IP system 110.

At 340, the supplier 103 may receive clear funds, such as a day after the transaction. At 342, the VCN service 142 may poll the payment network to determine whether the transaction has cleared. For example, the IP system 110 may transmit requests for transaction status to the VCN service 142, which may poll the payment network 140 for the transaction status.

Figure 4:
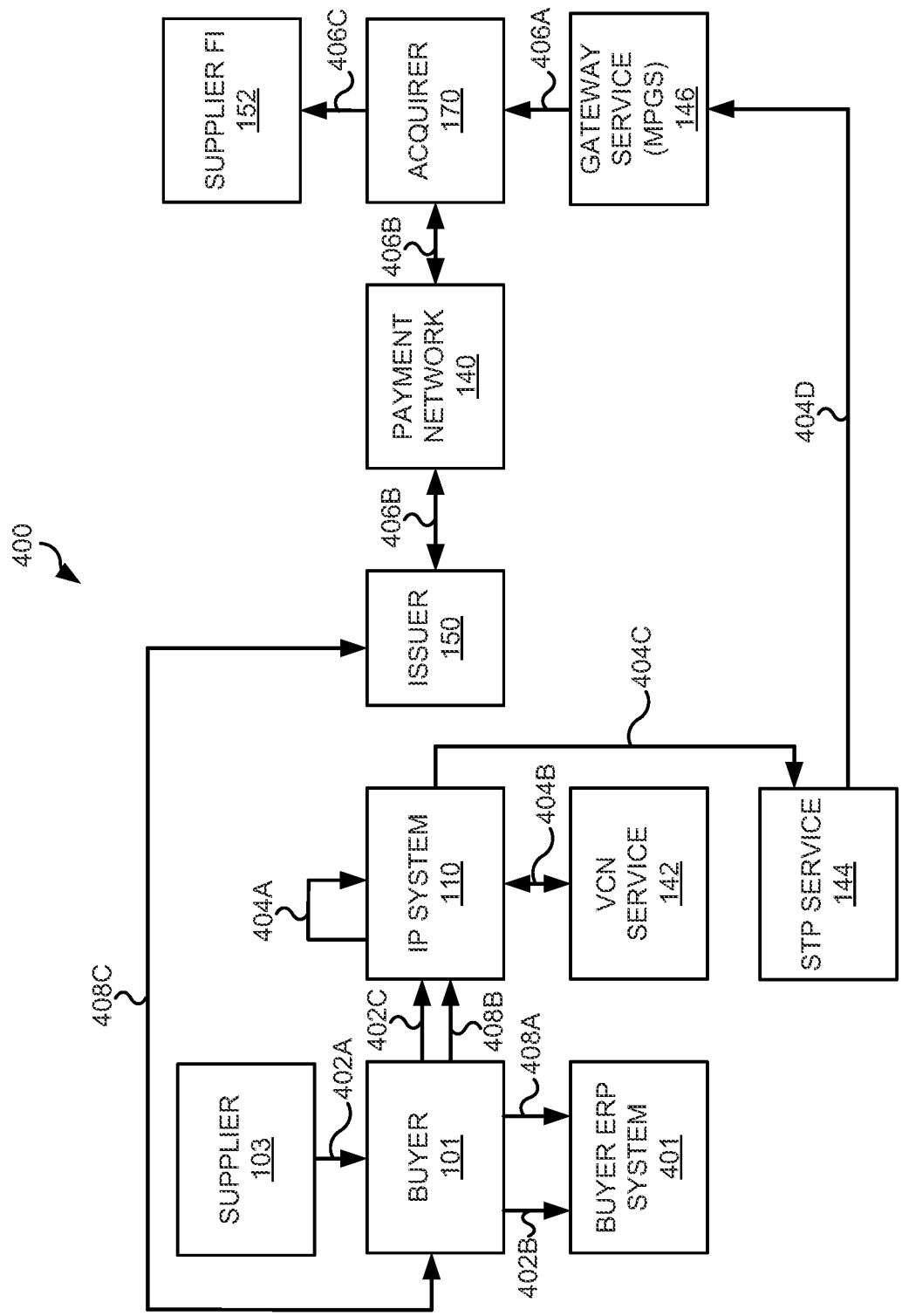
FIG. 4 illustrates a flow diagram of example operations of a Straight Through Processing (STP) model for instant payment of invoices.

FIG. 4 illustrates a flow diagram 400 of example operations of an STP model for instant payment of invoices. In the example operations that follow, operations 402A-C represent invoice routing operations, operations 404A-D represent VCN authorization, operations 406A-C represent VCN payment operations, and operations 408A-C represent buyer settlement.

Invoice Routing

At 402A, the supplier 103 may transmit an invoice to the buyer 101. At 402B, the buyer 101 may record the invoice into a buyer ERP system 401. At 402C, the buyer 101 may transmit the invoice to the IP system 110. In some examples, the buyer 101 may transmit the invoice in batches with other invoices from the supplier 103 and/or other suppliers 103. Such batches may be transmitted hourly, daily, and/or on some other periodic basis. In other examples, the buyer 101 may transmit the invoice in real-time. "Real-time" may refer to a non-batched transmission to the IP system 110 when the buyer 101 receives the invoice from the supplier 103.

VCN Authorization

At 404A, the IP system 110 may score a likelihood of invoice approval by buyer 101. Such scoring may be similar to the scoring described with respect to operation 204A in FIG. 2. At 404B, the IP system 110 may request a VCN 105 from the VCN service 142. For example, the IP system 110 may make a call to an API linked to an ICCP instance of the issuer 150. At 404C, the IP system 110 may transmit the VCN 105 to the STP service 144. For example, the IP system 110 may transmit the VCN 105 via an API call. At 404D, the STP service 144 may transfer the VCN 105 to the gateway service (MPGS) 146.

VCN Payment

At 406A, the gateway service 146 may append data to emulate a supplier point of sale (POS) terminal. As such, the gateway service 146 may emulate a POS terminal that would be used in a purchase transaction such as one in a brick-and-mortar store. The gateway service 146 may validate the emulated data and may route a transaction to the appropriate acquirer 170.

At 406B, the acquirer 170 may receive a transaction request and route the transaction request for authorization, clearing and settlement via the payment network 140, which requests authorization from the issuer 150. At 406C, the acquirer 170 may fund an account, such as the DDA 107, of the supplier 103 held at the supplier FI 152. In some examples, the acquirer 170 may transmit a consolidated remittance file to a supplier ERP of the supplier 103 (not illustrated in FIG. 4).

Buyer Settlement

At 408A, the buyer 101 may record an invoice approval status in the buyer ERP system 401. At 408B, the buyer 101 may transmit newly approved invoice data, such as via a data feed, to the IP system 110. At 408C, the buyer 101 may settle an outstanding credit line with the issuer 150 according to their internal processing and may receive a rebate for using the platform provided by the IP system 110.

Figure 5:
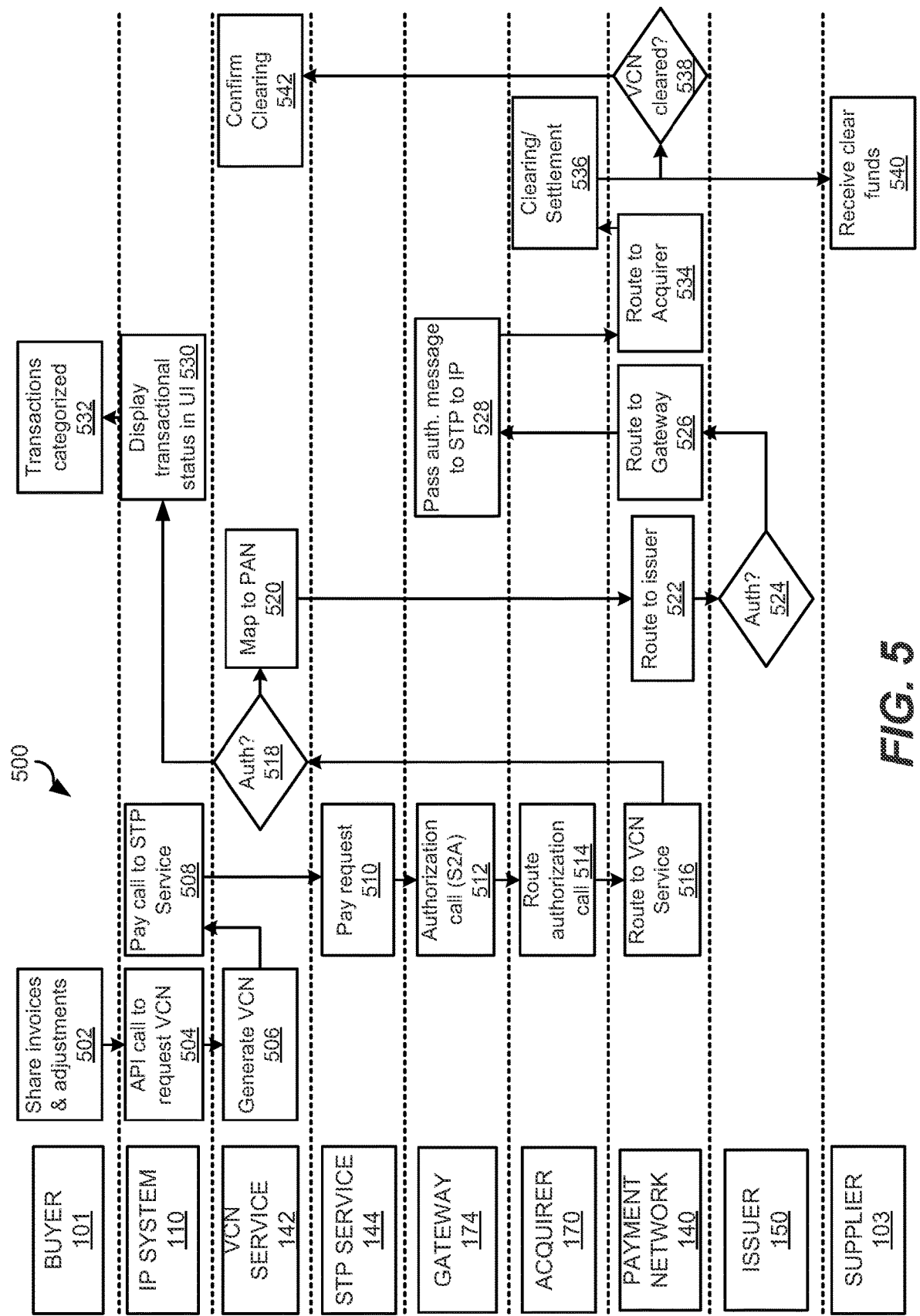
FIG. 5 illustrates a flow diagram of example instant payment transactions in the STP model of FIG. 4.

FIG. 5 illustrates a flow diagram 500 of example instant payment transactions in the STP model of FIG. 4. At 502, the buyer 101 may share new invoices and adjustments to invoices with the IP system 110, such as through the data feed interface 120. Such sharing may occur on a periodic basis such as on a daily, weekly, or other periodic basis. At 504, the IP system 110 may access the shared invoices from the buyer 101. The IP system 110 may identify the buyer 101, such as through the participant identifier, which may be included in the data accessed via the data feed interface 120. The IP system 110 may request a VCN 105 for the buyer 101, such as through an API call to the VCN service 142.

At 506, the VCN service 142 may generate a VCN 105 for the buyer 101 responsive to the request from the IP system 110. The VCN 105 may encode an identification number that indicates an account of the buyer 101 from which a payment is to be made. The identification number (such as the first four to six digits) may include a BIN that identifies the VCN service 142 so that the VCN 105 may identify not only the account of the buyer 101, but also the VCN service 142 to which to route payments.

At 508, the IP system 110 may receive the VCN 105 from the VCN service 142 and generate a pay call to the STP service 144. At 510, the STP service 144 may transmit a pay request to the gateway 174. At 512, the gateway 174 may generate and transmit an authorization call to the acquirer 170. The authorization call may be formatted as an ISO 8583 message and configured as an S2A transaction. At 514, the acquirer 170 may route the authorization call to the payment network 140.

At 516, the payment network 140 may recognize the VCN service 142 from the VCN 105. For example, the payment network 140 may recognize the VCN service 142 via the BIN corresponding to the VCN service 142 encoded in the VCN 105. The payment network 140 may then route the VCN 105 back to the VCN service 142 for authentication. At 518, the VCN service 142 may determine whether the VCN 105 is authentic by consulting its previously created VCNs. At 520, responsive to a determination that the VCN 105 is authentic, the VCN service 142 may map the VCN 105 to the corresponding PAN of the buyer 101. The VCN service 142 may then provide the PAN back to the payment network 140.

At 522, the payment network 140 may identify an issuer 150 based on the PAN and route the PAN to the identified issuer 150 for authorization of the invoice amount. At 524, the issuer 150 may determine whether the invoice amount from the PAN is authorized. The issuer 150 may apply various rules such as credit limit rules to determine whether the invoice amount should be authorized. The issuer 150 may transmit an authentication message back to the payment network 140.

At 526, the payment network 140 may route the authentication message to the gateway 174. At 528, the gateway 174 may pass the authentication message to IP system 110 and/or the STP service 144, which may pass the authentication message to the IP system 110. At 530, the IP system 110 may provide a transactional status based on the authentication message to indicate whether or not the invoice payment was approved. At 532, the buyer 101 (or the ERP or AP system of the buyer) may store an indication of the transactional status and categorize the invoice.

At 534, the gateway 174 may route a settlement request to the acquirer 170 through the payment network 530. At 536, the acquirer 170 may add the transaction to a clarifying file and apply an assigned identifier for the supplier 103. For example, in the Mastercard® network, the assigned identifier may include the Mastercard® Assigned Identifier (MAID). Other identifiers that may be required by other payment networks 140 may be used as well or instead, depending on the particular payment network 140 being used. The payment mediator 180 may generate a clearing/settlement instruction for clearing funds on behalf of the supplier 103, such as to credit the DDA 107 of the supplier 103.

At 538, the payment network 140 may provide indications of whether or not the transaction has cleared. At 540, the supplier 103 may receive clear funds, such as a day after the transaction. At 542, the VCN service 142 may poll the payment network 140 to determine whether the transaction has cleared. For example, the IP system 110 may transmit requests for transaction status to the VCN service 142, which may poll the payment network 140 for the transaction status.

Figure 6:
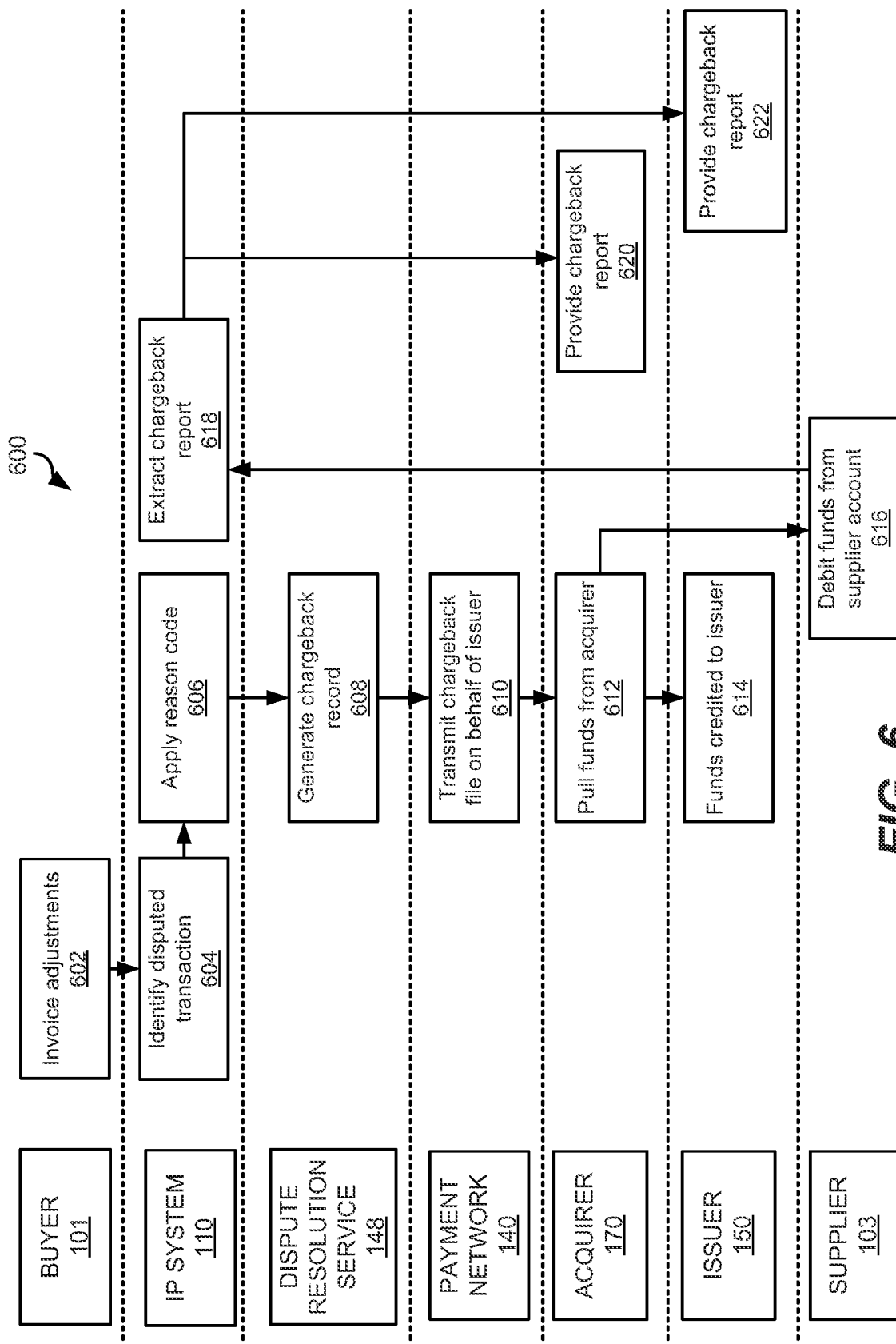
FIG. 6 illustrates an example chargeback process of correcting instant payment transactions of invoices.

FIG. 6 illustrates an example chargeback process 600 of correcting instant payment transactions of invoices. In some instances, an automatic prediction of approval of a given invoice for payment may be incorrect. The buyer 101 may submit invoice adjustments for such automatically approved invoices. In response, the IP system 110 may initiate the chargeback process 600.

For example, at 602, the buyer 101 may transmit invoice adjustments to the IP system 110. For example, the buyer 101 may transmit the adjustments in a manner similar to operation 302 illustrated in FIG. 3. The adjustments may include reductions of invoice amounts and/or identification of invoices that should have been denied payment. At 604, the IP system 110 may identify relevant transactions submitted to the payment network 140 for payment of the invoice. For example, the IP system 110 may store an invoice identifier that identifies each invoice shared from a buyer 101 and/or supplier 103 and the IP system 110 may look up a transaction identifier that is mapped to an invoice to be adjusted. When a payment transaction through the payment network 140 is initiated by the IP system 110 (such as through the operations illustrated at FIGS. 2-6), a transaction identifier that identifies the transaction may be stored in association with the invoice identifier. In this manner, the IP system 110 may map a given invoice with a payment transaction used to make payment, through the payment network 140, for the invoice.

At 606, the IP system 110 may generate a chargeback request, apply a reason code to the chargeback request, and transmit the chargeback request to the dispute resolution service 148. The IP system 110 may generate the chargeback request as an ISO 8583 message that is compatible with the payment network 140. The ISO 8583 format may include message type indicators and reason codes. A message type indicator may encode a type of the message such as an authorization message or a chargeback message, among others. The IP system 110 may encode the message type indicator to refer to a chargeback message. A reason code may encode an explanation for the message type indicated by the message type indicator. The IP system 110 may encode the reason code to indicate a reason for the reversal or chargeback of the invoice amount that was previously submitted for payment of the invoice.

At 608, the dispute resolution service 148 may generate a chargeback record in response to the chargeback request, and transmit the chargeback record to the payment network 140. At 610, the payment network 140 may transmit a chargeback file to the acquirer 170 on behalf of the issuer 150. At 612, funds may be pulled from the acquirer 170. At 614, funds may be credited to the issuer 150. At 616, funds may be debited from the account of the supplier 103 to which the original invoice payment was made, such as the DDA 107. At 618, the IP system 110 may extract a chargeback report. At 620 and 622, the IP system 110 may provide the chargeback report to the acquirer 170 and the issuer 150.

Figure 7:
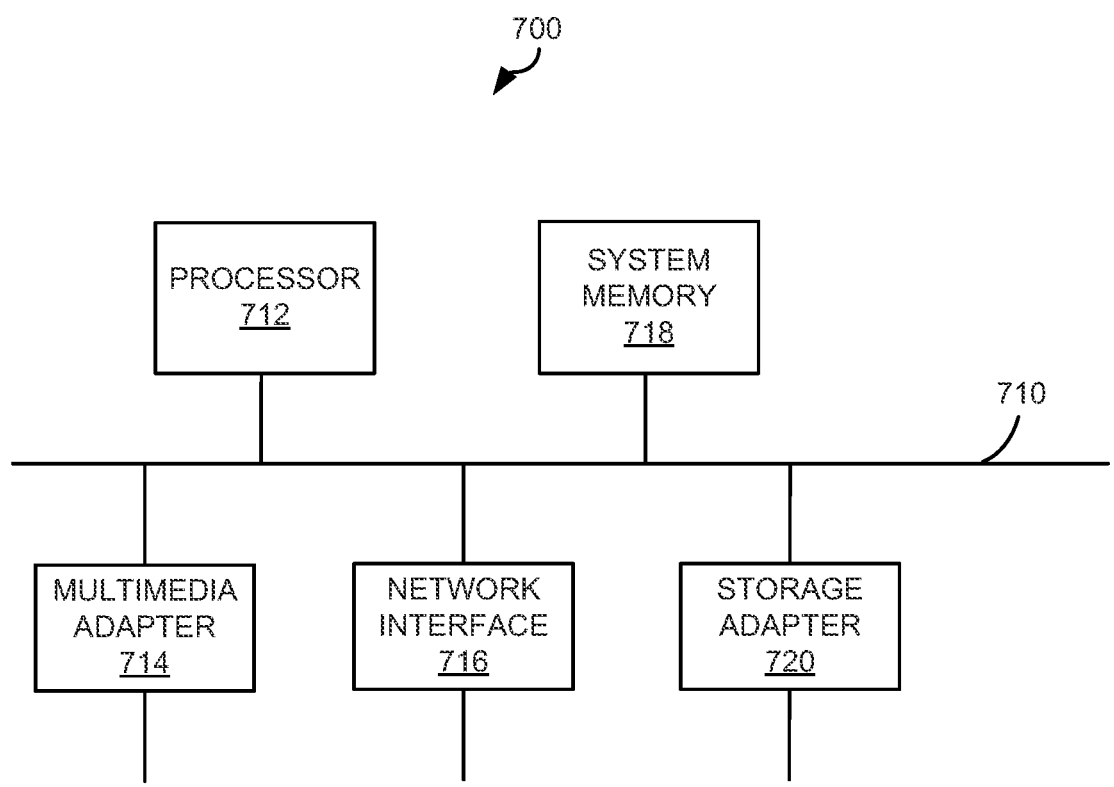
FIG. 7 illustrates an example of a computer system that may be implemented by devices illustrated in FIG. 1.

FIG. 7 illustrates an example of a computer system that may be implemented by devices illustrated in FIG. 1. Various ones of the devices of system environment 100 may be implemented based on some or all of the computer system 700. The computer system 700 may include, among other things, an interconnect 710, a processor 712, a multimedia adapter 714, a network interface 716, a system memory 718, and a storage adapter 720.

The interconnect 710 may interconnect various subsystems, elements, and/or components of the computer system 700. As shown, the interconnect 710 may be an abstraction that may represent any one or more separate physical buses, point-to-point connections, or both, connected by appropriate bridges, adapters, or controllers. In some examples, the interconnect 710 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1384 bus, or "firewire," or other similar interconnection element.

In some examples, the interconnect 710 may allow data communication between the processor 712 and system memory 718, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 712 may control operations of the computer system 700. In some examples, the processor 712 may do so by executing instructions such as software or firmware stored in system memory 718 or other data via the storage adapter 720. In some examples, the processor 712 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 714 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 716 may provide the computer system 700 with an ability to communicate with a variety of remove devices over a network such as the communication network 121 illustrated in FIG. 1. The network interface 716 may include, for example, an Ethernet adapter, a Fibre Channel adapter, and/or other wired- or wireless-enabled adapter. The network interface 716 may provide a direct or indirect connection from one network element to another, and facilitate communication and between various network elements.

The storage adapter 720 may connect to a standard computer readable medium for storage and/or retrieval of information, such as a fixed disk drive (internal or external).

Other devices, components, elements, or subsystems (not illustrated) may be connected in a similar manner to the interconnect 710 or via a network such as the communication network 121. The devices and subsystems can be interconnected in different ways from that shown in FIG. 7. Instructions to implement various examples and implementations described herein may be stored in computer-readable storage media such as one or more of system memory 718 or other storage. Instructions to implement the present disclosure may also be received via one or more interfaces and stored in memory. The operating system provided on computer system 700 may be MS-DOS®, MS-WINDOWS®, OS/2®, OS X®, IOS®, ANDROID®, UNIX®, Linux®, or another operating system.

Figure 8:
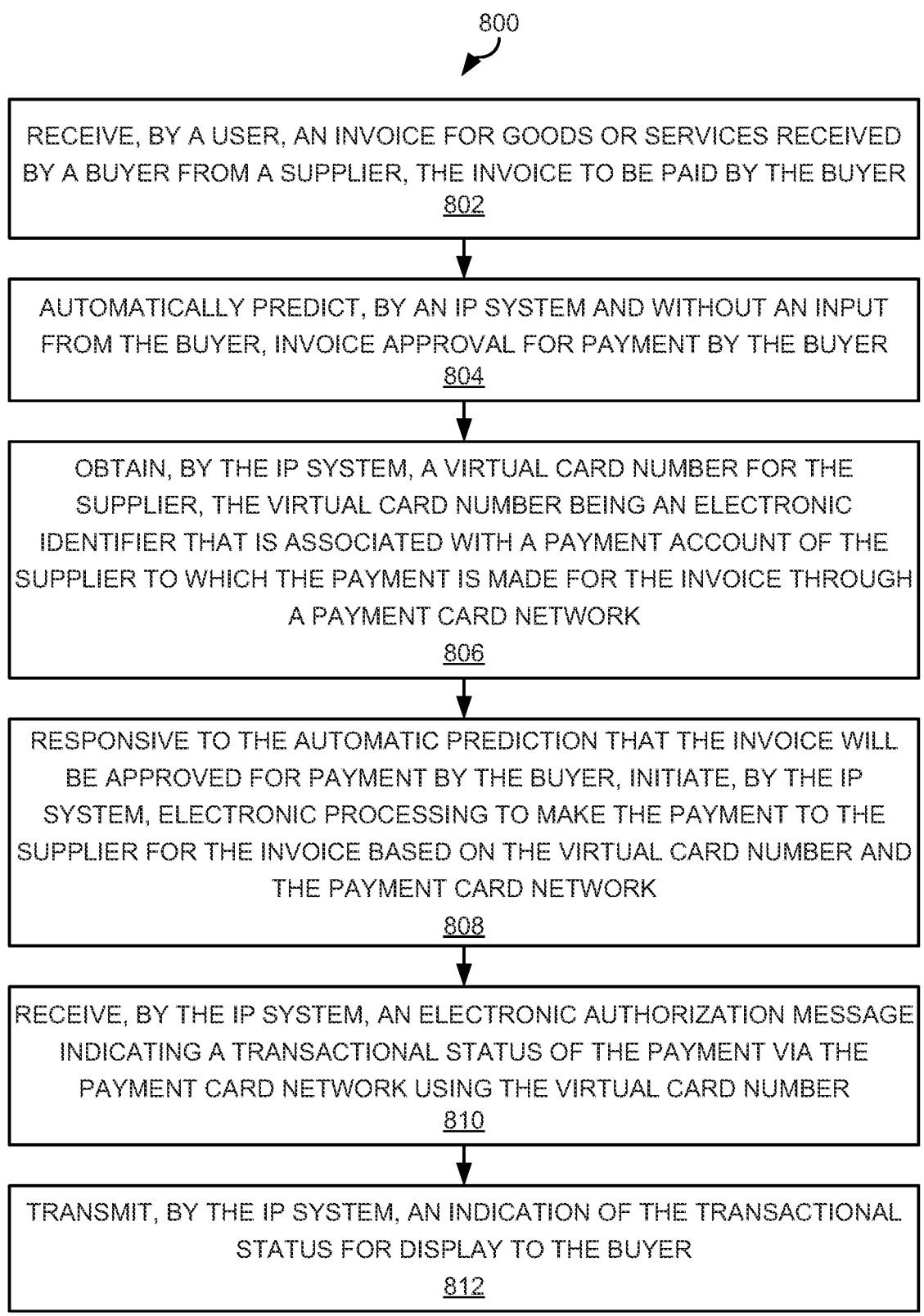
FIG. 8 illustrates an example of a method of instant payment of invoices through an electronic payment network.

FIG. 8 illustrates an example of a method 800 of instant payment of invoices through an electronic payment network (such as the payment network 140). At 802, the method 800 may include receiving an invoice for goods or services received by a buyer (such as buyer 101) from a supplier (such as supplier 103), the invoice to be paid by the buyer. At 804, the method 800 may include automatically predicting, by the IP system 110 and without an input from the buyer, invoice approval for payment by the buyer. For example, the automatic prediction may be based on the probability, or score, of invoice approval by the buyer. An example of such scoring is discussed with respect to the invoice classifier.

At 806, the method 800 may include obtaining, by the IP system 110, a virtual card number (such as VCN 105) for the supplier, the virtual card number being an electronic identifier that is associated with a payment account of the supplier to which the payment is made for the invoice through a payment card network (such as payment network 140). The IP system 110 may obtain the VCN 105 from a VCN service 142.

At 808, responsive to the automatic prediction of invoice approval for payment by the buyer, the method 800 may include initiating, by the IP system 110, electronic processing to make the payment to the supplier for the invoice based on the virtual card number and the payment card network. Examples of the electronic processing may include the processing illustrated at FIGS. 2-5.

At 810, the method 800 may include receiving, by the IP system 110, an electronic authorization message indicating a transactional status of the payment via the payment card network 140 using the virtual card number. At 812, the method 800 may include transmitting, by the IP system 110, an indication of the transactional status for display to the buyer.

Figure 9:
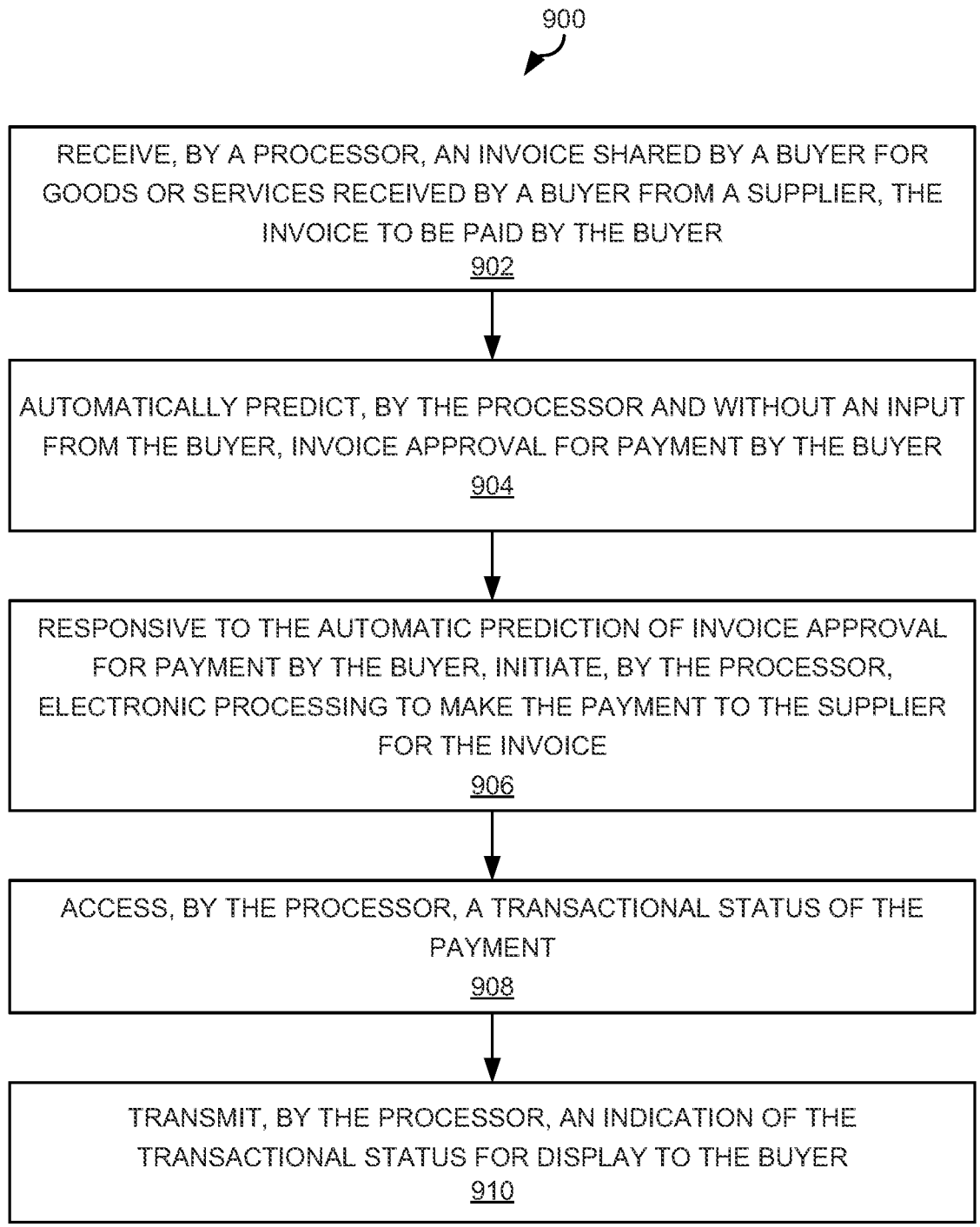
FIG. 9 illustrates another example of a method of instant payment of invoices through an electronic payment network.

FIG. 9 illustrates another example of a method 900 of instant payment of invoices through an electronic payment network (such as the payment network 140). At 902, the method 900 may include receiving, by a processor 112 of an IP system 110, an invoice shared by a buyer for goods or services received by a buyer from a supplier, the invoice to be paid by the buyer. At 904, the method 900 may include automatically predicting, by the processor 112 and without an input from the buyer, invoice approval for payment by the buyer. At 906, responsive to the automatic prediction of invoice approval for payment by the buyer, the method 900 may include initiating, by the processor 112, electronic processing to make the payment to the supplier for the invoice. At 908, the method 900 may include accessing, by the processor 112, a transactional status of the payment. At 910, the method 900 may include transmitting, by the processor 112, an indication of the transactional status for display to the buyer.

Figure 10:
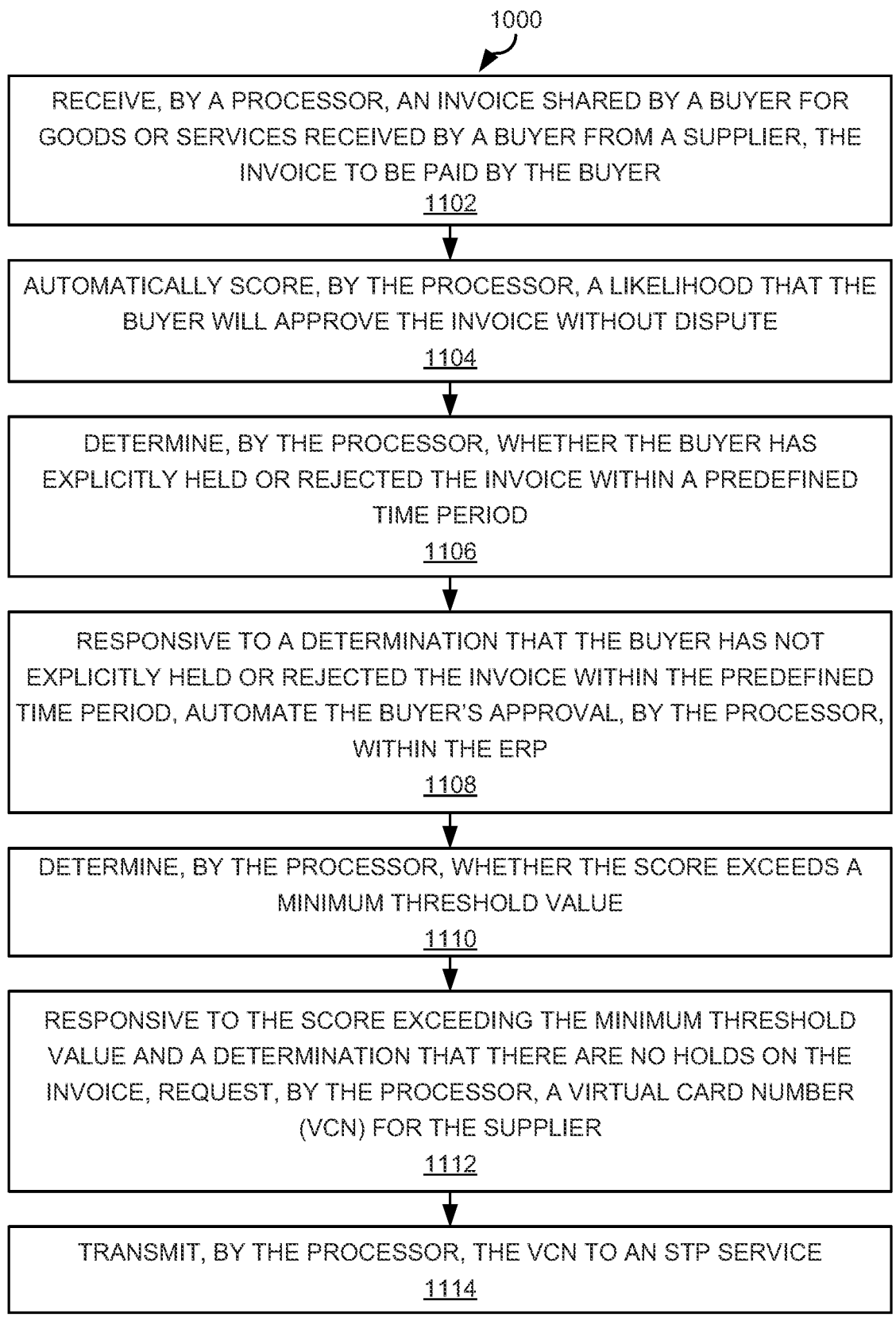
FIG. 10 illustrates a further example of a method of instant payment of invoices through an electronic payment network.

FIG. 10 illustrates a further example of a method 1000 of instant payment of invoices through an electronic payment network (such as the payment network 140). At 1102, the method 1000 may include receiving, by a processor 112 of an IP system 110, invoice data shared by a buyer 101 for goods or services received by the buyer 101 from a supplier, the invoice to be paid by the buyer 101. At 1104, the method 1000 may include automatically scoring, by the processor 112 a likelihood that the buyer 101 will approve the invoice without dispute. At 1106, the method 1000 may include determining, by the processor 112, whether the buyer 101 has explicitly held or rejected the invoice within a predefined time period. By way of particular example, the predefined time period may be at or around 5 days from the receipt of the invoice data.

At 1108, the method 1000 may include, responsive to a determination that the buyer has not explicitly held or rejected the invoice within the predefined time period, automating the buyer's approval, by the processor 112, within the ERP system 201. At 1110, the method 1000 may include, determining, by the processor 112, whether the score calculated at 1104, exceeds a minimum threshold value such as around a 90%, or 0.90 probability. Other threshold values may be used. In some examples, the threshold value may be modified or updated based on observations of invoice results. For example, if the buyer 101 indicates that an invoice predicted to be approved by the buyer 101 should have been denied, then the IP system 110 may increase and/or use a higher threshold value.

At 1112, the method 1000 may include, responsive to the score exceeding the minimum threshold value and a determination that there are no holds on the invoice, requesting, by the processor 112, a virtual card number (VCN 105) for the supplier. For instance, the processor 112 may request the VCN 105 from the VCN service 142 by making a call to an API linked to an ICCP instance of the issuer 150. In addition, the processor 112 may request the VCN 105 following the predefined time period, e.g., on day 6 after receipt of the invoice. At 1114, the method 1000 may include transmitting, by the processor 112, the VCN 104 to an STP service 144, for instance, via an API call.

On day 7 after receipt of the invoice, the acquirer 170 may route the transaction for authorization, clearing, and settlement. Funds may then be deposited in the supplier's merchant account. In some examples, the buyer 101 may settle outstanding transactions and may earn a rebate, for instance, on day 8 after receipt of the invoice.

Throughout the disclosure, the terms "a" and "an" may be intended to denote at least one of a particular element. As used herein, the term "includes" means includes but not limited to, the term "including" means including but not limited to. The term "based on" means based at least in part on. In the Figures, the use of the letter "N" to denote plurality in reference symbols is not intended to refer to a particular number.

It should be noted that AI and machine-learning as generally described herein throughout may refer to various types of systems that involve training, validating, and using intelligent behavior in computers. For example, broadly speaking, AI may include systems, programmed by computer instructions, that are improved to act "intelligently" in a manner that is able to learn from observations. Machine-learning may include particular computational training of computer systems so that computers may learn from observed data to alter their behavior. Machine-learning may include deep learning techniques, which may involve training a computer based on labels. In various examples, the labels may be based on invoices that were known to be approved. The systems may further correlate deeper layers that incorporate features such as invoice data to make identify relationships between the features with the labels. In this manner, deep learning techniques may model multiple layers of features with labels to generate probabilistic classifications of invoices, where such classifications relate to probabilities that an invoice will be approved. Likewise, deep learning techniques may learn embeddings to identify aspects of invoice data that facilitate intelligent recognition of an approved invoice based on the learned embeddings. Such embeddings may be used to intelligently recognize approved invoices by comparison to known invoice data of approved invoices.

The databases described herein (such as the participant database 111 and invoice corpus 113) may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The components of the system environment 100 illustrated in FIG. 1 may be connected to one another via a communication network (not illustrated), which may include the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network through which system environment 100 components may communicate.

The systems and processes are not limited to the specific embodiments described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system components illustrated in the figures.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system of providing instant invoice payments for invoices from a supplier to a buyer, comprising:
   a processor programmed to:
   receive an invoice for goods or services received by a buyer from a supplier, the invoice to be paid by the buyer;
   execute an invoice classifier trained on a training corpus comprising a plurality of invoices to predict whether the invoice will be approved or not approved by learning from: at least a first set of invoices from among the plurality of invoices in the training corpus that were approved and at least a second set of invoices from among the plurality of invoices in the training corpus that were declined;
   receive, based on execution of the invoice classifier, a classification indicating whether or not the invoice will be approved;
   determine whether the buyer has explicitly held or rejected the invoice within a predefined time period;
   responsive to a determination that the buyer has not explicitly held or rejected the invoice within the predefined time period:

automatically predict, without an input from the buyer, invoice approval for payment by the buyer based on the classification from the invoice classifier;

wherein to automatically predict invoice approval, the processor is programmed to:
  automatically score a likelihood that the buyer will approve the invoice without dispute, and
  determine whether the score exceeds a minimum threshold value to automatically predict invoice approval for payment by the buyer;

obtain a virtual card number for the supplier responsive to the score exceeding the minimum threshold value and a determination that there are no holds on the invoice, the virtual card number being an electronic identifier that is associated with a payment account of the supplier to which the payment is made for the invoice through a payment card network;

responsive to the automatic prediction, initiate electronic processing to make the payment to the supplier for the invoice based on the virtual card number and the payment card network;

receive an electronic authorization message indicating a transactional status of the payment via the payment card network using the virtual card number; and transmit an indication of the transactional status for display to the buyer.

2. The system of claim 1, wherein to initiate electronic processing to make the payment, the processor is further programmed to:
  transform invoice data from the invoice into an electronic mail message comprising the virtual card number and amount of the payment; and
  transmit, to a payment mediator that makes an authorization call to the payment card network, the electronic mail message.

3. The system of claim 1, wherein to initiate electronic processing to make the payment, the processor is further programmed to:
  generate an Application Programming interface (API) payment call comprising the virtual card number and amount of the payment; and
  transmit, to a straight-through processing (STP) system that routes a payment request to a payment gateway that routes an authorization call to the payment card network, the API payment call.

4. The system of claim 1, wherein the processor is further programmed to:
  access payment processing configuration information of the buyer, the payment processing configuration information defining whether an electronic mail intercept procedure or a straight-through processing (STP) procedure is to be used for the buyer to make the payment for the invoice; and
  wherein to initiate electronic processing to initiate the payment, the processor is further programmed to initiate the electronic mail intercept procedure or the STP procedure based on the payment processing configuration information.

5. The system of claim 1, wherein to obtain the virtual card number, the processor is further programmed to:
  generate an Application Programming Interface (API) call to obtain the virtual card number; and
  transmit the API call to a virtual card number service that manages virtual card numbers.

6. The system of claim 1, wherein the output of the invoice classifier relates to a probability of whether or not the invoice will be approved and wherein to automatically make the prediction, the processor is further programmed to:
  determine whether the probability meets or exceeds a predetermined threshold probability.

7. The system of claim 1, wherein the processor is further programmed to:
  receive, from the buyer, a confirmation that the buyer approves of the automatic prediction; and
  add the confirmation to the training corpus of invoices to refine training for the invoice classifier.

8. The system of claim 1, wherein the processor is further programmed to:
  receive, from the buyer, an indication that the buyer has rejected the invoice;
  identify a payment transaction on the payment card network corresponding to the payment;
  generate a chargeback request comprising a reason code that indicates rejection of the invoice; and
  transmit the chargeback request to a chargeback processor.

9. The system of claim 8, wherein the processor is further programmed to:
  extract a chargeback report from the chargeback processor; and
  transmit the chargeback report to an acquirer of the supplier that receive the payment on behalf of the buyer and/or an issuer associated with the virtual card number.

10. The system of claim 1, wherein to initiate electronic processing to make the payment to the supplier for the invoice, the processor is further programmed to:
  transmit the virtual card number to a gateway server;
  emulate, by the gateway server, a supplier point of sale (POS) terminal based on the virtual card number; and
  transmit, by the supplier POS terminal emulated by the gateway server, a transaction request to an acquirer, which routes the transaction request for payment via a payment network.

11. The system of claim 10, wherein to emulate the supplier POS terminal, the processor is further programmed to:
  generate the transaction request based at least on the virtual card number, invoice amount, and a supplier identifier that identifies the supplier.

12. A method, comprising:
  receiving, by a processor, an invoice for goods or services received by a buyer from a supplier, the invoice to be paid by the buyer;
  executing, by the processor, an invoice classifier trained on a training corpus comprising a plurality of invoices to predict whether the invoice will be approved or not approved by learning from: at least a first set of invoices from among the plurality of invoices in the training corpus that were approved and at least a second set of invoices from among the plurality of invoices in the training corpus that were declined;
  receiving, by the processor, based on execution of the invoice classifier, a classification indicating whether or not the invoice will be approved;
  determining, by the processor, whether the buyer has explicitly held or rejected the invoice within a predefined time period;
  responsive to a determination that the buyer has not explicitly held or rejected the invoice within the predefined time period:

automatically predicting, by the processor, without an input from the buyer, invoice approval for payment by the buyer based on the classification from the invoice classifier;
wherein automatically predicting invoice approval comprises:
automatically scoring, by the processor, a likelihood that the buyer will approve the invoice without dispute, and
determining, by the processor, whether the score exceeds a minimum threshold value to automatically predict invoice approval for payment by the buyer;
obtaining, by the processor, a virtual card number for the supplier responsive to the score exceeding the minimum threshold value and a determination that there are no holds on the invoice, the virtual card number being an electronic identifier that is associated with a payment account of the supplier to which the payment is made for the invoice through a payment card network;
responsive to the automatically predicting invoice approval for payment by the buyer, initiating electronic processing to make the payment to the supplier for the invoice based on the virtual card number and the payment card network;
receiving, by the processor, an electronic authorization message indicating a transactional status of the payment via the payment card network using the virtual card number; and
transmitting, by the processor, an indication of the transactional status for display to the buyer.

13. The method of claim 12, wherein initialing electronic processing to make the payment comprises:
generating an electronic mail message comprising the virtual card number and amount of the payment; and
transmitting, to a payment mediator that makes an authorization call to the payment card network, the electronic mail message.

14. The method of claim 12, wherein initiating electronic processing to make the payment comprises:
generating an Application Programming Interface (API) payment call comprising the virtual card number and amount of the payment; and
transmitting, to a straight-through processing (STP) system that routes a payment request to a payment gateway that routes an authorization call to the payment card network, the API payment call.

15. The method of claim 12, further comprising:
accessing payment processing configuration information of the buyer, the payment processing configuration information defining whether an electronic 1nail intercept procedure or a straight-through process (STP) procedure is to be used for the buyer to make the payment for the invoice; and
wherein initiating electronic processing to initiate the payment comprises: initiating the electronic mail intercept procedure or the STP procedure based on the payment processing configuration information.

16. The method of claim 12, further comprising:
receiving, from the buyer, an indication that the buyer has rejected the invoice;
identifying a payment transaction on the payment card network corresponding to the payment;
generating a chargeback request comprising a reason code that indicates rejection of the invoice; and
transmitting the chargeback request to a chargeback processor.

17. The method of claim 16, further comprising:
extracting a chargeback report from the chargeback processor; and
transmitting the chargeback report to an acquirer of the supplier that receive the payment on behalf of the buyer and/or an issuer associated with the virtual card number.

18. A system of providing instant invoice payments for invoices from a supplier to a buyer, comprising:
a processor programmed to:
receive an invoice shared by a buyer for goods or services received by a buyer from a supplier, the invoice to be paid by the buyer;
execute an invoice classifier trained on a training corpus comprising a plurality of invoices to predict whether the invoice will be approved or not approved by learning from: at least a first set of invoices from among the plurality of invoices in the training corpus that were approved and at least a second set of invoices from among the plurality of invoices in the training corpus that were declined;
receive, based on execution of the invoice classifier, a classification indicating whether or not the invoice will be approved;
determine whether the buyer has explicitly held or rejected the invoice within a predefined time period;
responsive to a determination that the buyer has not explicitly held or rejected the invoice within the predefined time period:
automatically predict, without an input from the buyer, invoice approval for payment by the buyer based on the classification from the invoice classifier;
wherein to automatically predict invoice approval, the processor is programmed to:
automatically score a likelihood that the buyer will approve the invoice without dispute, and
determine whether the score exceeds a minimum threshold value to automatically predict invoice approval for payment by the buyer;
obtain a virtual card number for the supplier responsive to the score exceeding the minimum threshold value and a determination that there are no holds on the invoice, the virtual card number being an electronic identifier that is associated with a payment account of the supplier to which the payment is made for the invoice through a payment card network;
responsive to the automatic prediction of invoice approval for payment by the buyer, initiate electronic processing to make the payment to the supplier for the invoice based on the virtual card number and the payment card network;
access a transactional status of the payment; and
transmit an indication of the transactional status for display to the buyer.

* * * * *